United States Patent
Lundblade

(10) Patent No.: US 8,424,068 B2
(45) Date of Patent: *Apr. 16, 2013

(54) METHODS AND APPARATUS FOR PROVIDING APPLICATION CREDENTIALS

(75) Inventor: Laurence Lundblade, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/270,771

(22) Filed: Oct. 11, 2011

(65) Prior Publication Data

US 2012/0030742 A1 Feb. 2, 2012

Related U.S. Application Data

(63) Continuation of application No. 10/697,397, filed on Oct. 29, 2003, now Pat. No. 8,037,515.

(51) Int. Cl.
*H04L 29/06* (2006.01)

(52) U.S. Cl.
USPC .................................. 726/6; 726/7

(58) Field of Classification Search .................. None
See application file for complete search history.

(56) References Cited

U.S. PATENT DOCUMENTS

| | | | |
|---|---|---|---|
| 5,560,008 | A | 9/1996 | Johnson et al. |
| 5,987,232 | A | 11/1999 | Tabuki |
| 6,272,631 | B1 | 8/2001 | Thomlinson et al. |
| 6,477,645 | B1 | 11/2002 | Drews |
| 6,668,327 | B1 | 12/2003 | Prabandham et al. |
| 6,785,262 | B1 | 8/2004 | Yao et al. |
| 7,010,690 | B1 | 3/2006 | Hanna et al. |
| 7,047,560 | B2 | 5/2006 | Fishman et al. |
| 7,146,635 | B2 | 12/2006 | Eggebraaten et al. |
| 7,210,167 | B2 | 4/2007 | Brezak et al. |
| 7,752,434 | B2 | 7/2010 | Mereu et al. |
| 8,037,515 | B2 | 10/2011 | Lundblade |
| 2002/0023059 | A1 | 2/2002 | Bari et al. |
| 2003/0037237 | A1 | 2/2003 | Abgrall et al. |
| 2003/0074392 | A1 | 4/2003 | Campbell et al. |
| 2003/0114144 | A1 | 6/2003 | Minemura |
| 2004/0049588 | A1 | 3/2004 | Shinohara et al. |
| 2004/0180646 | A1 | 9/2004 | Donley et al. |
| 2005/0071677 | A1 | 3/2005 | Khanna et al. |

FOREIGN PATENT DOCUMENTS

CL 027362004 8/2005

(Continued)

OTHER PUBLICATIONS

3GPP TSG SA WG3 Security S3#26, "Architecture to support subscriber certificates based on new 'gateway' type element," Nov. 19-22, 2002, S3-020634.
European Search Report—EP04796868, Search Authority—Munich Patent Office, Jun. 18, 2010.
International Preliminary Report on Patentability, PCT/US04/036284—International Preliminary Examining Authority—US, Mar. 16, 2006.

(Continued)

*Primary Examiner* — Minh Dinh
(74) *Attorney, Agent, or Firm* — Fariba Yadegar-Bandari

(57) ABSTRACT

Methods and apparatus for providing an application credential for an application running on a device. In one embodiment, a method provides an application credential to an application running on a device, wherein the application credential is used by the application to authenticate to a data server. The method comprises receiving a request to generate the application credential, wherein the request includes an application identifier. The method also comprises generating the application credential using the application identifier and a master credential associated with the device.

31 Claims, 9 Drawing Sheets

| | FOREIGN PATENT DOCUMENTS | |
|---|---|---|
| CL | 027372004 | 8/2005 |
| RU | 2169437 | 6/2001 |
| WO | WO9845768 A1 | 10/1998 |
| WO | WO9907007 | 2/1999 |
| WO | WO9952077 A1 | 10/1999 |
| WO | WO0035143 A1 | 6/2000 |
| WO | WO0208873 | 1/2002 |
| WO | WO0219598 | 3/2002 |
| WO | WO2005043335 | 5/2005 |
| WO | WO2005043336 | 5/2005 |

OTHER PUBLICATIONS

International Search Report, PCT/US04/036284—International Search Authority—US, Nov. 3, 2005.

Menezes, A. et al.: Handbook of Applied Cryptogrophy, Chapter 9, Hash Functions and Data Integrity, CRC Press (1999).

Written Opinion, PCT/US04/036284—International Search Authority—US, Nov. 3, 2005.

METHODS AND APPARATUS FOR PROVIDING APPLICATION CREDENTIALS

CLAIM OF PRIORITY UNDER 35 U.S.C. §120

The present application for patent is a continuation, of patent application Ser. No. 10/697,397 entitled "METHODS AND APPARATUS FOR PROVIDING APPLICATION CREDENTIALS" filed Oct. 29, 2003, pending, and assigned to the assignee hereof and hereby expressly incorporated by reference herein in its entirety.

BACKGROUND

I. Field

The present invention relates generally to credential systems, and more particularly, to methods and apparatus for providing application credentials to applications running on a device for the purpose of authentication and security.

II. Description of the Related Art

Advances in technology have resulted in the development and deployment of extensive data networks. These networks include both public data networks, such as the Internet, and specialized networks, such as wireless telecommunication networks. Users of these networks have the ability to access a wide variety of information and services that are available as network resources.

One example where there is an increasing demand for network resources is in wireless network environments. In wireless environments, a variety of wireless devices, such as wireless telephones, personal digital assistants (PDAs), and paging devices, communicate over a wireless network. The wireless network may also include network servers that operate to provide various network resources to the wireless devices. Furthermore, the wireless networks may also be coupled to a public network, such as the Internet, so that resources on the public network can be made available to the wireless devices on the wireless network.

Typically, a wireless device may download an application program from a wireless network. The application may be downloaded for free or purchased by the user of the wireless device, who effectively obtains the rights to use the application or content for an unlimited, fixed, or usage count based expiration period. During execution, the application may attempt to retrieve proprietary data from a data server. For example, the application may be a news retrieval application, and during operation, the application requests news data from a proprietary news data server. Before transmitting the data, the data server needs to verify that the application is authorized to receive the data. It is therefore necessary for the application to authenticate to the data server.

However, strong authentication is not possible unless there is a secret shared between the device and the server that is different for every device. If that is not the case, reverse engineering of the application will reveal enough information to gain access to the server. The shared secret should be distributed out of band, and not over the network connection between the device and the server. One approach is to provision a separate key into every device at the time of manufacture or sale. This is how some systems operate to authenticate voice calls. However, this technique does not scale to large numbers of applications, doesn't work for applications that are downloaded after purchase of the device, and application vendors may not have access to the manufacturing or sales process.

Another technique is to issue separate passwords to the each device user where the passwords are distributed using voice mail, email, paper mail, or some other out of band means. This may provide a partial solution, however, this techniques results in more user responsibility, more overhead for the application or content developer, and the requirement to create, distribute, and maintain passwords for every application used by every user.

Therefore, what is needed is a system to provide application credentials that can be used by applications running on a device to authenticate their requests for data from proprietary data servers, where the application credentials provide strong authentication without the need to have multiple passwords for every device.

SUMMARY

In one or more embodiments, a credential system is described that provides credentials to applications running on a device. In one embodiment, an application running on a device provides an application identifier in a request for credentials that is sent to the credential system. The credential system uses the application identifier and a master credential to generate an application credential for use by the application. After obtaining the application credential, the application sends a request for data to a data server, and the request includes the application credential and the application identifier. The data server receives the request and includes the application identifier in a request for a server credential, which is sent to a credential server. The credential server has a copy of the master credential. The credential server uses the application identifier and the master credential to generate the server credential, which is transmitted back to the data server. The data server then compares the application credential with the server credential, and if they match, the server sends the requested data to the application. Thus, it is possible for the application to authenticate to the data server without the use of special passwords.

In another embodiment, the data server transmits the application identifier and the application credential to the credential server in a request for credential verification. The credential server generates a server credential using the application identifier and the master credential. The credential server compares the application credential with the server credential and determines whether or not the two credentials match. If the credentials match, the credential server transmits a positive indicator to the data server, thereby authorizing the data server to transmit the requested data to the application.

In one embodiment, a method provides an application credential to an application running on a device, wherein the application credential is used by the application to authenticate to a data server. The method comprises receiving a request to generate the application credential, wherein the request includes an application identifier. The method also comprises generating the application credential using the application identifier and a master credential associated with the device.

In another embodiment, apparatus is provided that operates to provide an application credential to an application running on the device, wherein the application credential is used by the application to authenticate to a data server. The apparatus comprises receiving logic that operates to receive a request for the application credential, wherein the request includes an application identifier. The apparatus also comprises generating logic that operates to generate the application credential using the application identifier and a master credential.

In another embodiment, apparatus is provided that operates to provide an application credential to an application running on the device, wherein the application credential is used by the application to authenticate to a data server. The apparatus comprises means for receiving a request for the application credential, wherein the request includes an application identifier. The apparatus also comprises means for generating the application credential using the application identifier and a master credential.

In another embodiment, a computer-readable media is provided comprising instructions, which when executed by a processor in a device, provide an application credential to an application running on the device, wherein the application credential is used by the application to authenticate to a data server. The computer readable media comprises instructions for receiving a request for the application credential, wherein the request includes an application identifier. The computer-readable media also comprises instructions for generating the application credential using the application identifier and a master credential.

In another embodiment, a method is provided for operating a credential server to authenticate an application running on a device, wherein the application transmits a request for data to a data server and the request comprises an application credential. The method comprises receiving an application identifier in a request for a server credential, and generating the server credential using the application identifier and a master credential. The method also comprises transmitting the server credential to the data server, wherein if the server credential and the application credential match the application is authenticated.

Other aspects, advantages, and features of the present invention will become apparent after review of the hereinafter set forth Brief Description of the Drawings, Detailed Description of the Invention, and the Claims.

BRIEF DESCRIPTION OF THE DRAWINGS

The foregoing aspects and the attendant advantages of the embodiments described herein will become more readily apparent by reference to the following detailed description when taken in conjunction with the accompanying drawings wherein.

DETAILED DESCRIPTION

The following detailed description describes a credential system that provides credentials to an application running on a device. The device may be any type of computing device such as a desktop computer, server, or other type of computer. The system is also well suited for use with portable devices such as, tablet computers, PDAs, wireless telephones, email devices, pagers or any other type of portable device. Therefore, although the system is suitable for use with a wide variety of devices, for the purpose of clarity, embodiments of the invention are described herein with reference to a wireless device.

The device includes a copy of a master credential that was installed in the device during manufacture, or by using some other secure procedure that protects the master credential from public disclosure. The master credential is also known to a credential server.

In one or more embodiments, the credential system interacts with a runtime environment executing on the device that is used to simplify operation of the device, such as by providing generalized calls for device specific resources. One such runtime environment is the Binary Runtime Environment for Wireless™ (BREW™) software platform developed by QUALCOMM, Inc., of San Diego, Calif. In the following description, it will be assumed that the device is executing a runtime environment, such as the BREW software platform. However, one or more embodiments of the credential system are suitable for use with other types of runtime environments to provide application credentials to applications running on a variety of wired and wireless devices.

Figure 1:
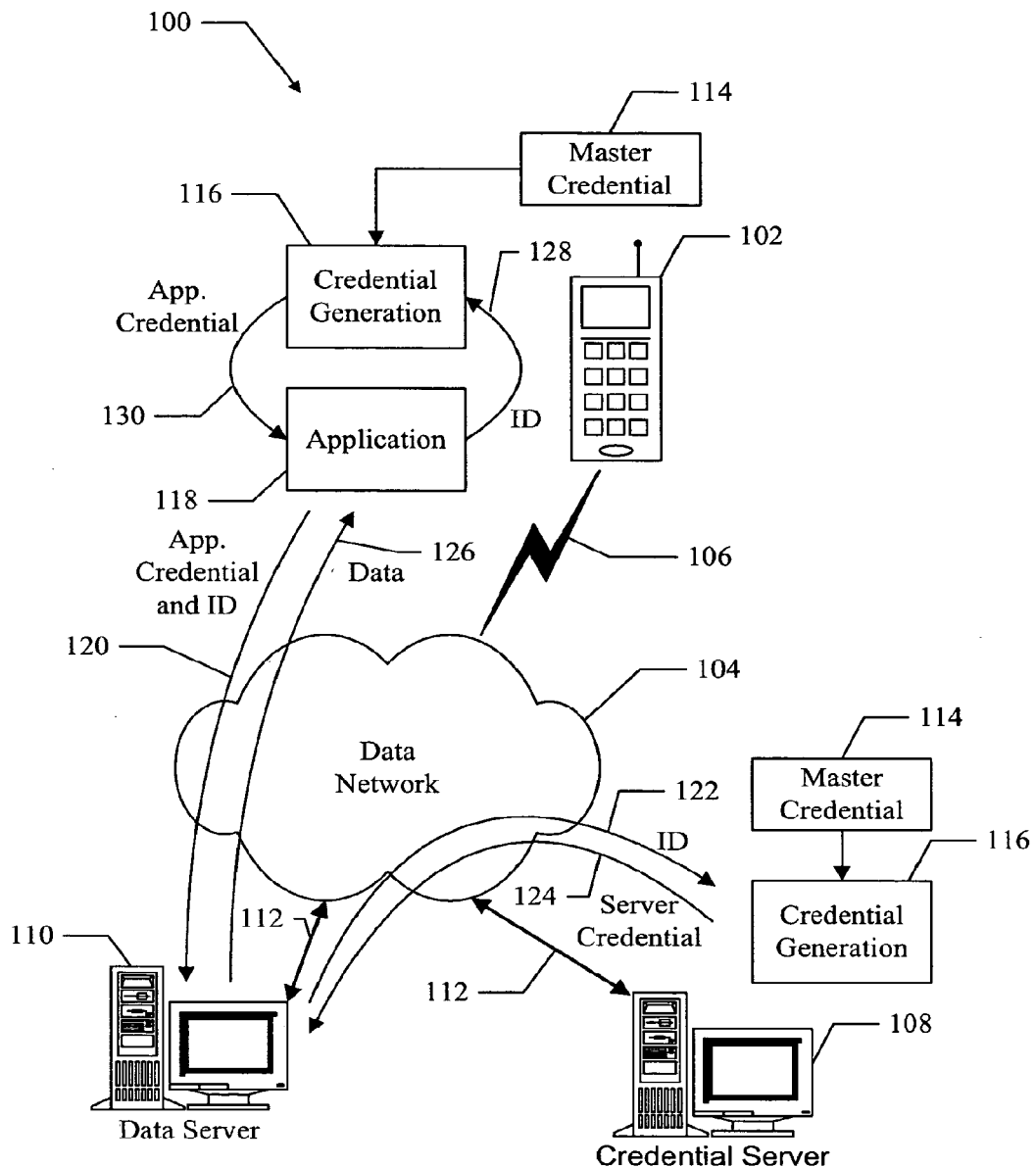
FIG. 1 shows a data network that comprises one embodiment of a credential system that provides application credentials to applications running on a wireless device.

FIG. 1 shows a data network 100 that comprises one embodiment of a credential system that provides application credentials to applications running on a device. The network 100 comprises a wireless device 102 that communicates with a data network 104 via a wireless communication channel 106. The network 100 may be any type of data network and comprise both wired and wireless components. The network 100 also comprises a credential server 108 that operates to provide services to the wireless device 102 and other entities in communication with the network 104. For example, the wireless device 102 may be a wireless telephone, and the credential server 108 may be part of a nationwide telecommunications network that provides telecommunication services to the device 102. Also in communication with the network 104 is a data server 110. The data server 110 operates to provide data, such as multimedia content or other types of data, to devices that are in communication with the wireless network 104.

In one embodiment, the device 102 includes a master credential 114 that was installed in the device during manufacture or by using some other secure procedure. The master credential 114 may be any type of suitable credential that is not made public to allow the device 102 to authenticate to other entities, such as the credential server 108. The device 102 also comprises credential generation logic 116. The credential generation logic 116 generates a credential based on specific input information. In one embodiment, the logic 116 uses a "one-way" generation technique so that the generated credential cannot be decoded or reversed to determine the input information that was used to generate the credential. For example, the logic 116 may use a hash function to generate the credential.

During operation, the credential system operates to provide application credentials to an applications running on the device 102 by performing one or more of the following steps.

1. An application program 118 running on the device 102 requests an application credential from the credential system. The application includes an application identifier (ID) in the request for the application credential. The request for the application credential is shown at 128.
2. The credential system uses the application ID and the Master Credential 114 to generate the application credential for the application 118. The application credential is returned to the application 118 as shown at 130.
3. The application 118 sends the application credential, and optionally the ID, to the data server 110 with a request to obtain data. The request to obtain data is shown at 120.
4. The data server 110 sends the ID to the credential server 108 in a request for a server credential. The request for the server credential is shown at 122.
5. The credential server 108 uses the ID and the Master Credential 114 to generate a server credential using the credential generating logic 116 that is located at the credential server 108. The resulting server credential is returned to the data server 110 as shown at 124.
6. The data server 110 compares the application credential with the server credential, and if the two match, the application's request 120 for data is authenticated and the data server 110 transmits the requested data, as shown at 126.

Therefore, because the application credentials can vary for each user, the system operates to authenticate both the user and the application.

Figure 2:
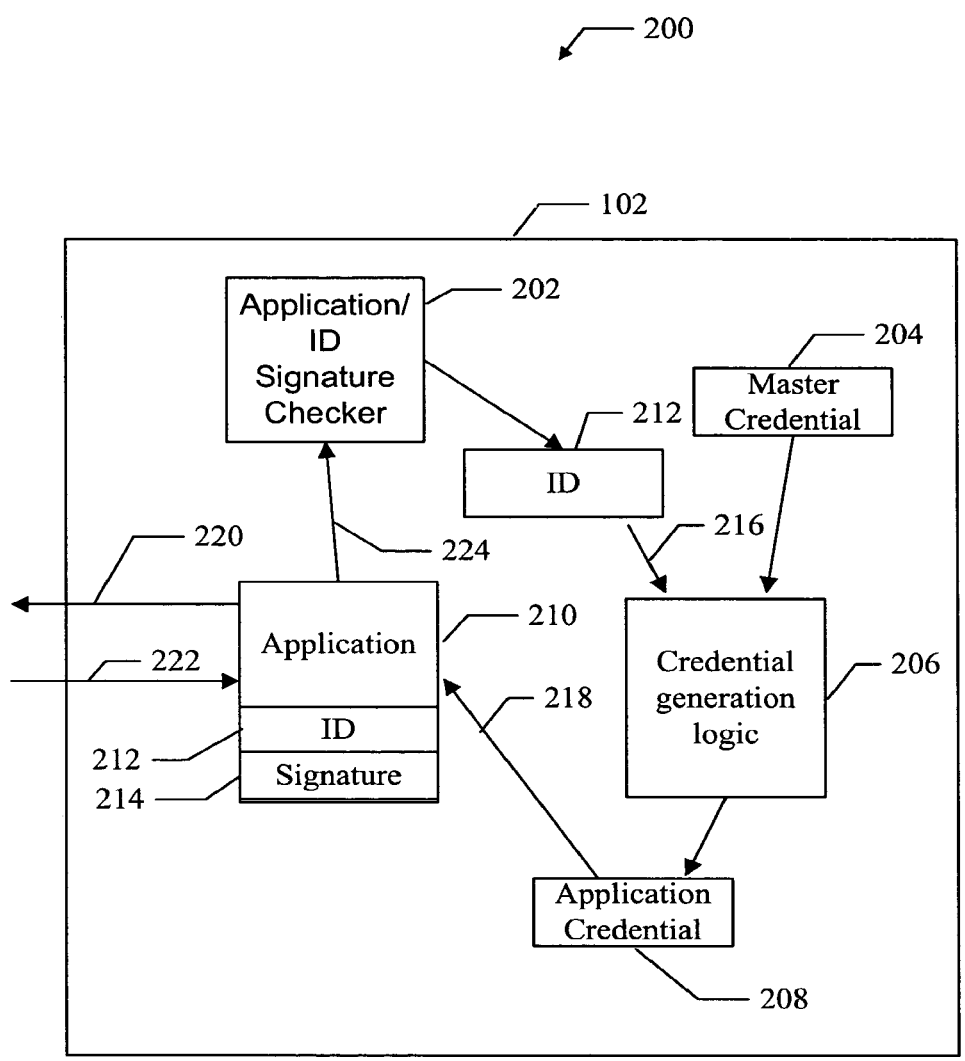
FIG. 2 shows a functional block diagram illustrating one embodiment of the wireless device of FIG. 1 that includes one embodiment of a credential system that operates to provide application credentials to applications running on the device.

FIG. 2 shows a functional block diagram 200 illustrating one embodiment of the device 102 that includes one embodiment of a credential system that provides application credentials to applications running on the device 102.

The device 102 comprises an application/ID signature checker 202, credential generation logic 206, a master credential 204, an application 210, an application ID 212, and a digital signature 214. The master credential 204 is stored in a secure non-volatile memory or other secure logic so that it is protected from erasure and unauthorized disclosure. The signature 214 was created by some application signing service or authority and binds the application 210 with the application ID 212. In one or more embodiments, any type of modification detection technique can be used in place of the signature 214.

The application/ID signature checker 202 detects if information encoded with the digital signature has been modified. It also allows the handset to know in a strong way that the application is truly the one assigned the particular application ID. For example, by providing the application 210, the ID 212, and the signature 214 to the checker 202, the checker 202 can determine if the application 210 and/or the ID 212 have been changed or modified after the digital signature was created. In one or more embodiments, the checker 202 operates with any type of modification detection technique.

The credential generation logic 206 generates a credential based on information received at its input. The generation logic 206 uses a "one-way" technique to generate the credential so that the credential cannot be decoded or reversed to determine the information used to create it.

During operation of one embodiment, the application 210 has an associated application ID 212 and a signature 214. The signature 214 binds the application 210 and the ID 212. The signature may have been generated by the application developer, or by a third party that is different from the application developer. The application 210 operates to retrieve data from a data server, for example, the data server 110 in FIG. 1. However, in order to retrieve the data, the application 210 needs to obtain an application credential to authenticate to the data server. The following method describes how in one embodiment, the credential system provides an application credential to the application 210, so that the application 210 can authenticate to a data server, for example, the server 110.

Figure 3:
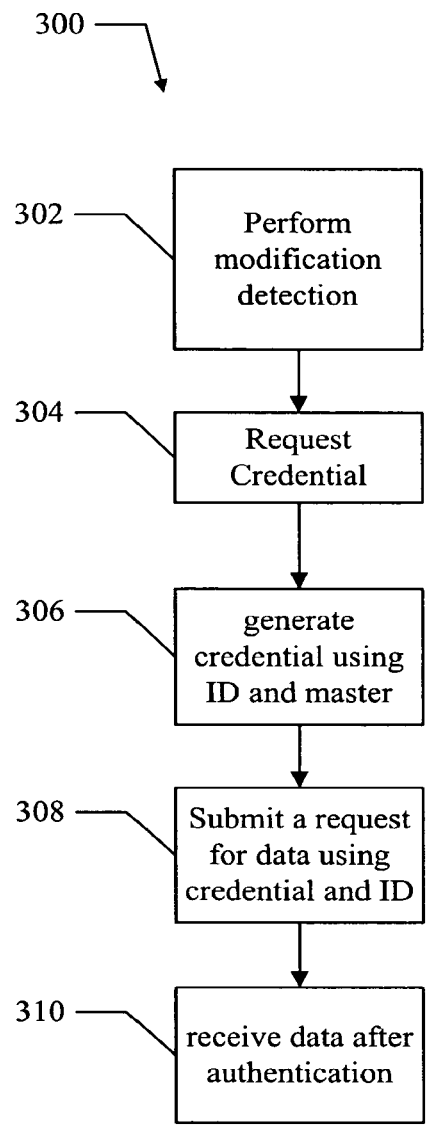
FIG. 3 shows one embodiment of a method for operating a credential system to provide application credentials to an application running on a device.

FIG. 3 shows one embodiment of a method 300 for operating a credential system to provide application credentials to an application running on a device. For example, the method 300 will be described with reference to the device 102 shown in FIG. 2. It will be assumed that the application 210 is running on the device 102 and that the application 210 requires an application credential to authenticate to a data server to retrieve data.

At block 302, the device operates to determine whether the application 210 and/or its ID 212 have been modified or incorrectly associated. In one embodiment, the application 210, the ID 212, and the signature 214 are sent to the checker 202, as shown by path 224. The checker 202 operates to use any known technique to verify that the application 210 and/or the ID 212 have not been modified.

At block 304, the application requests an application credential from the credential system so that the application can authenticate to a data server to retrieve data. In one embodiment, the application's ID 212 is provided to the credential generation logic 206, as shown by path 216 in a request for an application credential. Note that the application's ID 212 is provided after being checked so that an application can not provide an arbitrary ID in order to get credentials for other applications.

At block 306, an application credential is generated for the application. In one embodiment, the generation logic 206 generates the application credential 208 using the application ID 212, and the master credential 204. For example, in one embodiment, the generation logic 206 uses a hash function to generate the application credential 208, so that the application credential 208 cannot be decoded or reversed to discover the master credential 204. The application credential 208 is then returned to the application 210 as shown by path 218. Because the application credential 208 is generated using a "one-way" technique, the master credential 204 is never at risk of being discovered or disclosed.

At block 308, the application credential is used by the application to authenticate to a data server to retrieve data for use on the device. For example, the application 210 transmits the credential 208 in a request for data to the data server, as shown by path 220. The request may also include the application's ID 212. For example, the request is transmitted to the data server 110 in FIG. 1. The data server 110 may already have access to the application's ID, and so it may not be necessary for the device to transmit the ID to the data server.

At block 310, assuming the application's data request is authenticated; the requested data is transmitted to the application 210 from the data server, as shown by path 222. For example, the data server 110 receives the request from the application 210 and operates to authenticate the application before transmitting the requested data. A more detailed description of the authentication process performed by the data server is provided in another section of this document.

The method 300 is intended to be illustrative and not limiting of the operation of the various embodiments described herein. For example, it would be obvious to one with skill in the art to make minor changes, additions or deletions to any of the described methods. Furthermore, the described method steps may be combined, rearranged or reordered without deviating from the scope of the described embodiments.

Figure 4:
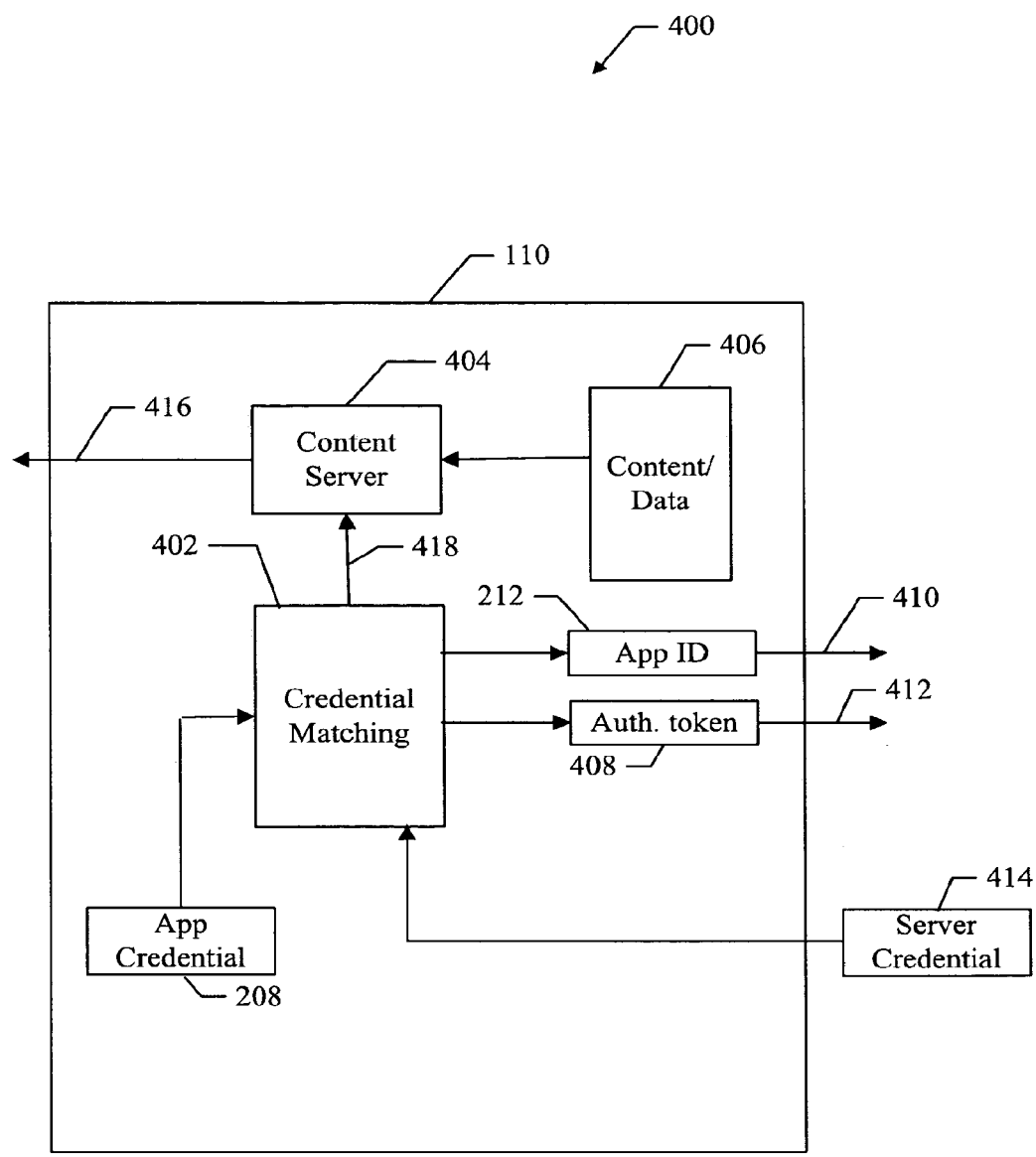
FIG. 4 shows a functional block diagram of a data server that includes one embodiment of a credential system that authenticates a request for data received from an application running on a device.

FIG. 4 shows a functional block diagram 400 of the data server 110 that includes one embodiment of a credential system that authenticates a request for data received from an application running on a device. For example, the server 110 receives a request for data from the application 210 and the request includes the application credential 208 and the application ID 212. After the server 110 authenticates the request, it provides the requested data to the application 210. The server 110 comprises a content server 404, content/data 406, credential and matching logic 402.

In one embodiment, the credential matching logic 414 operates to receive the application credential and the server credential and compare them. The result of the comparison 418 is sent to the content server 404. Usually the result 418 will be approval when the credentials are equal in value. The essential difference between the application credential 208 and the server credential 414 is that former was generated on the end user device and the later on the server.

It should be noted that the configuration of the server 110 is just one configuration suitable for implementing one embodiment of the credential system. It is also possible to implement the credential system using other servers or server configurations within the scope of the present invention.

Figure 5:
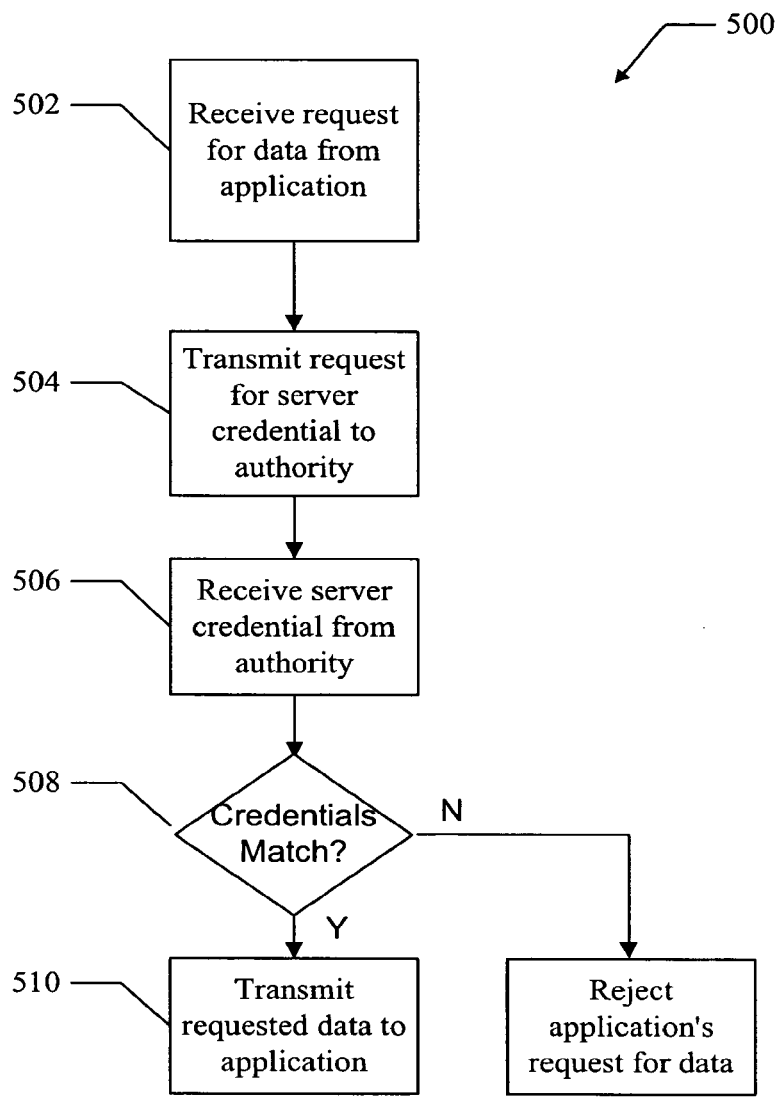
FIG. 5 shows one embodiment of a method for operating a data server in a credential system to authenticate an application credential provided by an application running on a device.

FIG. 5 shows one embodiment of a method 500 for operating a data server in a credential system to authenticate an application credential provided by an application running on a device. For example, the method 500 will be described with reference to the server 110 shown in FIG. 4. It will be assumed that the application 210 is running on the device 102, and that the application 210 obtains the application credential 208 from the credential system. The application 210 submits the application credential 208 and the application ID 212 in a request for data to the data server 110.

At block 502, the data server receives a request for data from an application running on a device. The request for data comprises the application credential 208 and the application ID 212.

At block 504, the data server requests a server credential from a credential server. For example, the application ID 212 and an authentication token 408 are sent (shown by 410 and 412) to the credential server in a request for a server credential. For example, the request is transmitted to the credential server 108.

At block 506, the server credential is received from the credential server. For example, the credential server 108 generates a server credential 414 using the application ID 212 and a copy of the master credential 204 stored at the credential server 108. The server credential 414 is generated using the same credential generation technique that was used to generate the application credential 208.

At block 508, a test is performed to determine if the server credential 414 matches the application credential 208, thereby authenticating the application 210 as the data requestor. For example, the matching logic 402 matches the two credentials using any type of matching technique. If the two credentials match, a positive indicator is provided at the matching output 418. As a result, the application's 210 data request is authenticated and the content server 404 operates to transmit content/data 406 to the application 210 to satisfy the application's data request. If the two credentials do not match, a negative indicator is provided at the match output 418 and the content server 404 does not provide any data in response to the data request.

The method 500 is intended to be illustrative and not limiting of the operation of the various embodiments described herein. For example, it would be obvious to one with skill in the art to make minor changes, additions or deletions to any of the described methods. Furthermore, the described method steps may be combined, rearranged or reordered without deviating from the scope of the described embodiments.

Figure 6:
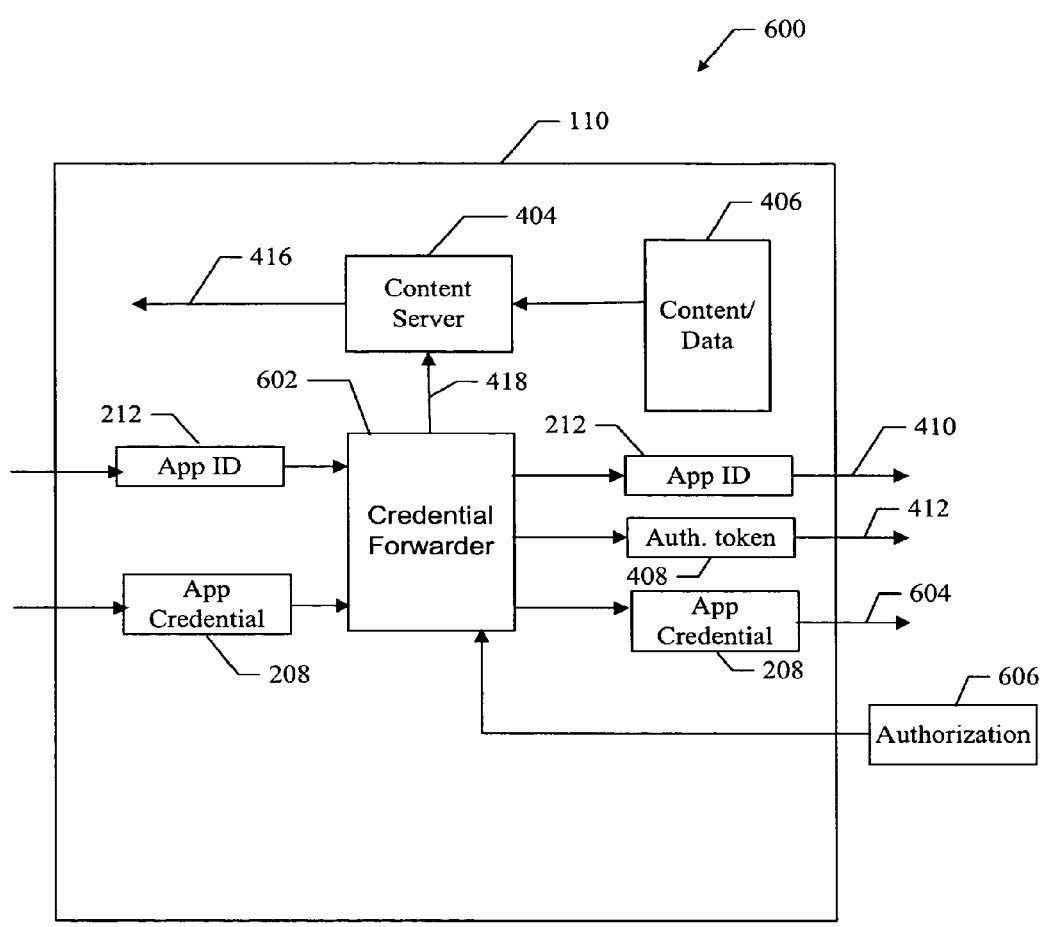
FIG. 6 shows a functional block diagram of another embodiment of a data server that includes one embodiment of a credential system that authenticates a request for data received from an application running on a device.

FIG. 6 shows a functional block diagram 600 of another embodiment of the data server 110 that includes one embodiment of a credential system that authenticates a request for data received from an application running on a device. In the embodiment shown in FIG. 6, the server 110 includes a credential forwarder 602 that forwards the ID 212, the authentication token 408, and the application credential 208 (shown at 410, 412, and 604) to the credential server. The credential server generates a server credential and compares the server credential with the application credential 208. If the application credential and the server credential match, the credential server transmits an authorization 606 to the data server 110. The authorization is forwarded (via path 418) to the content server 404, which then operates to transmit the content/data 406 to the requesting application 210. Thus, in the embodiment shown in FIG. 6, the credential server operates to compare the application credential to the server credential, where in the embodiment of FIG. 4, the data server 110 performs this comparison.

Figure 7:
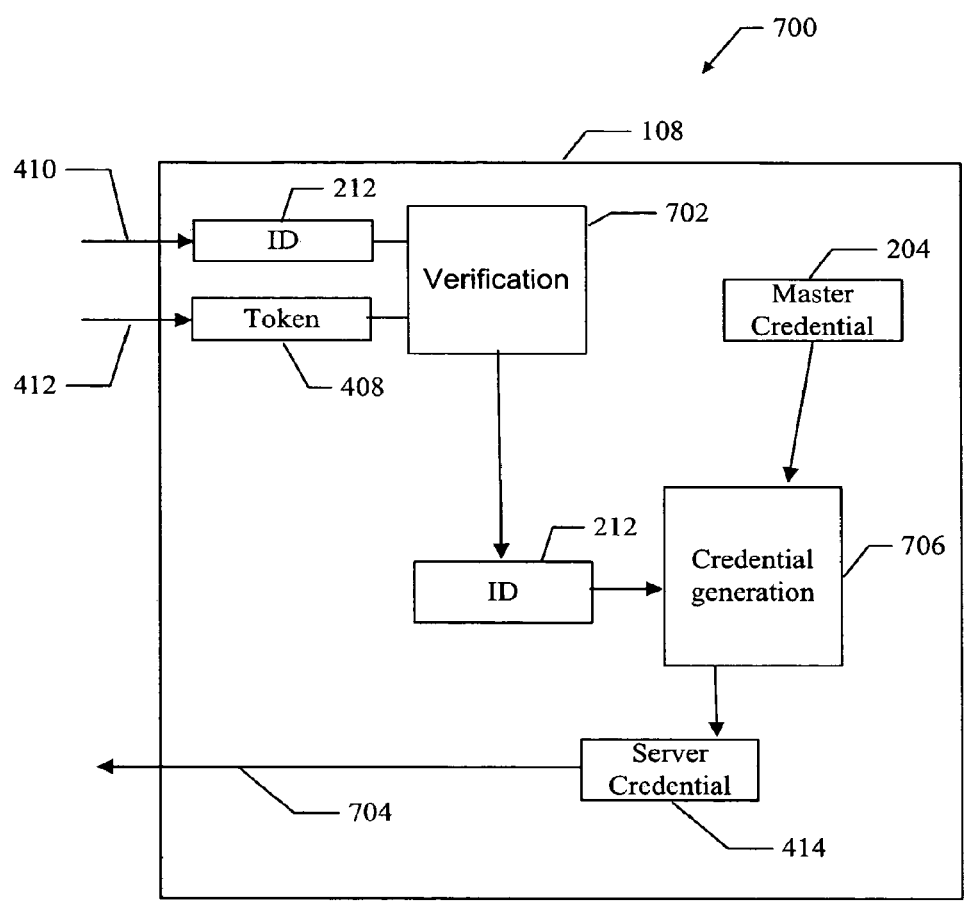
FIG. 7 shows one embodiment of a credential server that operates in a credential system to authenticate an application credential provided to an application running on a device.

FIG. 7 shows one embodiment of the credential server 108 that operates in a credential system to authenticate an application credential provided to an application running on a device. The credential server 108 comprises verification logic 702, the master credential 204 and the credential generation logic 706.

Figure 8:
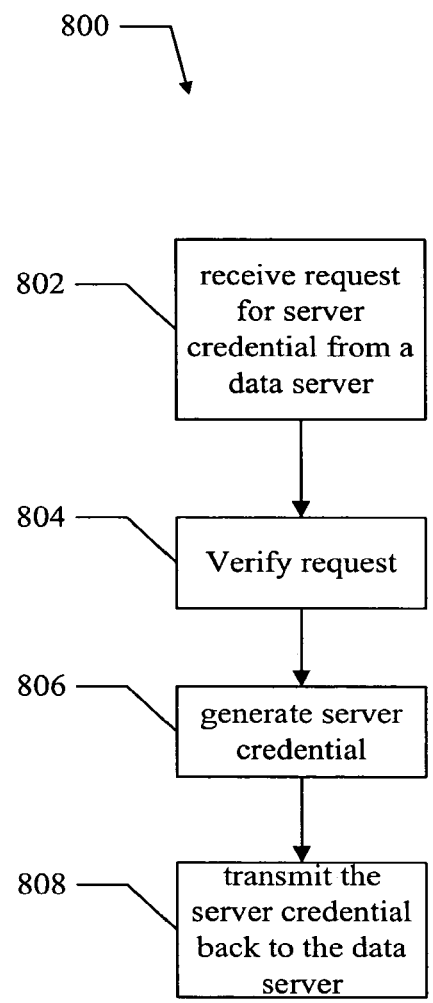
FIG. 8 shows one embodiment of a method for operating a credential server in a credential system to authenticate an application credential provided by an application running on a device.

FIG. 8 shows one embodiment of a method 800 for operating a credential server in a credential system to authenticate an application credential provided by an application running on a device. For example, the method 800 will be described with reference to the credential server 108 shown in FIG. 7. It will be assumed that the data server 110 has sent a request to the credential server 108 to obtain a server credential that can be matched to the application credential 208. The request for the server credential received by the credential server 108 includes the application ID 212 and the authentication token 408.

At block 802, the credential server 108 receives the request from the data server to obtain a server credential. For example, the data server 110 transmits a request to the credential server 108 to obtain a server credential, and the request includes the application ID 212 and the authentication token 408.

At block 804, the credential server 108 uses the authentication token 408 to authenticate the request at the verification logic 702. This authentication is used to be sure the request being made for a given application ID 212 from a data server that is allowed to access server credentials 414 belonging to the application indicated by the application ID 212.

At block 806, after the request has been verified, the credential generation logic 706 uses the application ID 212 and the master credential 204 to generate the server credential 414. The credential generation 706 logic in most embodiments will be functionally the same as the logic 206 on the end device 102.

At block 808, the credential server transmits the server credential 414 to the data server (as shown by path 704) so that the data server may use the server credential to authenticate a data request from an application running on a device.

The method 800 is intended to be illustrative and not limiting of the operation of the various embodiments described herein. For example, it would be obvious to one with skill in the art to make minor changes, additions or deletions to any of the described methods. Furthermore, the described method steps may be combined, rearranged or reordered without deviating from the scope of the described embodiments.

Figure 9:
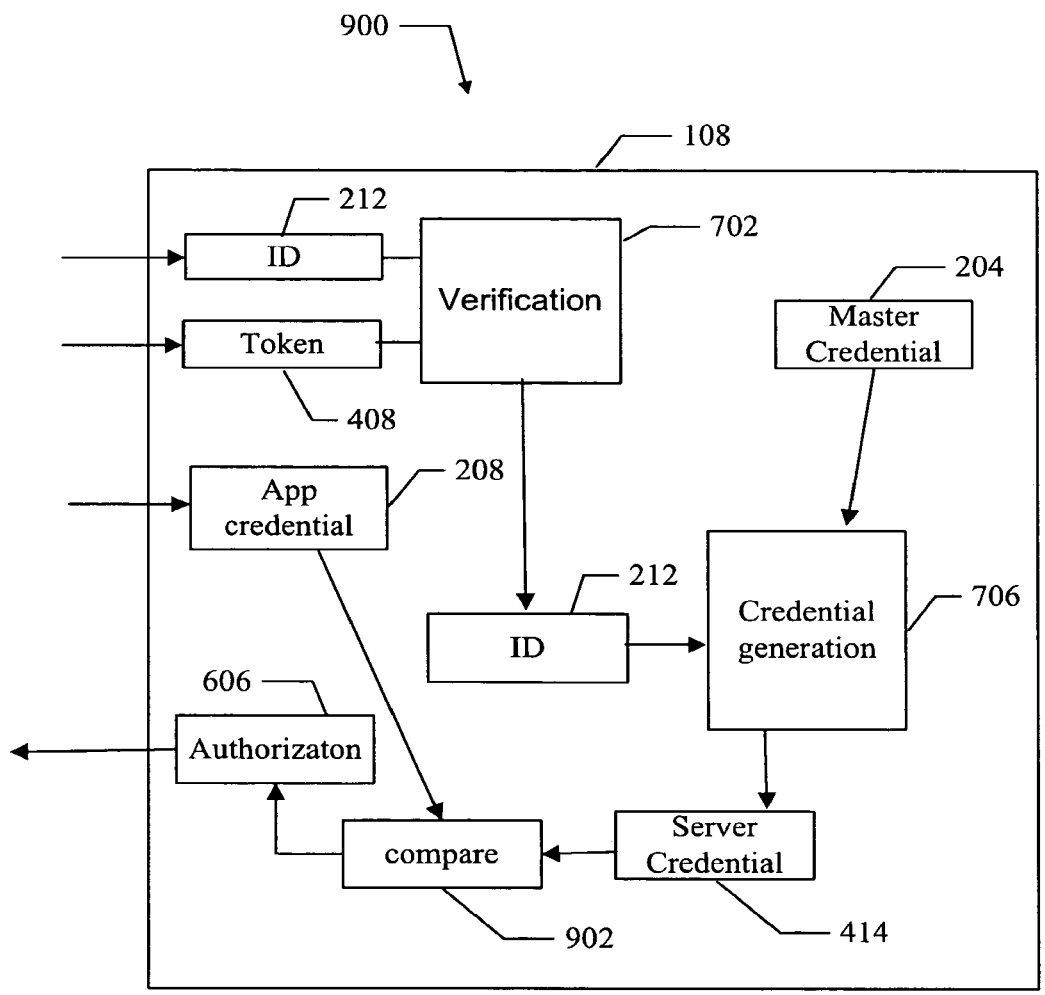
FIG. 9 shows a functional block diagram of another embodiment of a credential server that includes one embodiment of a credential system that authenticates a request for data received from an application running on a device.

FIG. 9 shows a functional block diagram 900 of another embodiment of the credential server 108 that includes one embodiment of a credential system that authenticates a request for data received from an application running on a device. In the embodiment shown in FIG. 9, the server 108 receives the application credential 208 and includes credential-matching logic 902.

During operation, the credential generation logic 706 generates the server credential 414, which is then compared to the application credential 208 at the credential matching logic 902. If the application credential 208 and the server credential 414 match, the credential server transmits the authorization 606 to the data server 110. Thus, in the embodiment shown in FIG. 9, the credential server 108 operates to compare the application credential 208 to the server credential 414, where in the embodiment of FIG. 7, the data server 110 performs this comparison.

Implementations

The above-described systems comprise interconnected functional elements that may be embodied in a variety of implementations. For example, any of the described elements may comprise a CPU, processor, gate array, hardware logic, memory, software, or any combination of hardware and software. Each system further comprises logic to execute machine-readable instructions to perform the functions described herein.

In one or more embodiments, the machine readable instructions are stored on computer-readable media that interfaces to any of the described systems, so that the instructions may be downloaded into the systems for execution to perform the described functions. The computer-readable media comprises floppy disks, hard disks, Flash memory, RAM, ROM, CDROM or any other type of computer-readable media that may contain instructions for execution by the systems described herein.

A credential system has been described that includes methods and apparatus to provide credentials to applications running on a device. The system is suitable for use with all types of devices and is especially well suited for use with wireless devices, such as mobile telephones, to provide application credentials to applications that need to authenticate to data servers or other systems.

Accordingly, while one or more embodiments of methods and apparatus for a credential system have been illustrated and described herein, it will be appreciated that various changes can be made to the embodiments without departing from their spirit or essential characteristics. Therefore, the disclosures and descriptions herein are intended to be illustrative, but not limiting, of the scope of the invention, which is set forth in the following claims.

I claim:

1. A method of obtaining information by which an application running on a device can be authenticated to a data server, comprising:
receiving a request to generate an application-specific credential for the application running on the device, wherein the request is associated with an application identifier that identifies the application; and
generating the application-specific credential using the application identifier and a device-specific master credential.

2. The method of claim 1, wherein the application-specific credential is generated using a one-way generation technique, so that the application identifier and the master credential cannot be discovered from the application-specific credential.

3. The method of claim 1, further comprising:
using a modification detection and/or authentication technique to determine if the application and/or the application identifier have been modified and to prove the application is associated with the application identifier.

4. The method of claim 3, wherein the modification detection and/or authentication technique is generated by a server that is distinct from a provider of the application.

5. The method of claim 3, wherein the modification detection and/or authentication technique is a digital signature.

6. The method of claim 1, wherein the device is a wireless device.

7. The method of claim 1, wherein the master credential corresponds to a shared secret key between the device and a credential server that is configured to authenticate, on behalf of the data server, a request for data from the application running on the device.

8. The method of claim 1, further comprising:
transmitting, to the data server, a request for data that includes the application identifier and the application-specific credential.

9. A device configured to provide information by which an application running on the device can be authenticated to a data server, comprising:
receiving logic that operates to receive a request to generate an application-specific credential for the application running on the device, wherein the request is associated with an application identifier that identifies the application; and
generating logic that operates to generate the application-specific credential using the application identifier and a device-specific master credential.

10. The device of claim 9, wherein the generating logic uses a one-way credential generation technique, so that the application identifier and the device-specific master credential cannot be discovered from the application-specific credential.

11. The device of claim 10, further comprising a modification detection and/or authentication technique that operates to determine if the application and/or the application identifier have been modified and prove the application is associated with the application identifier.

12. The device of claim 11, wherein the modification detection and/or authentication technique is generated by a server distinct from a provider of the application.

13. The device of claim 11, wherein the modification detection and/or authentication technique is a digital signature.

14. The device of claim 9, wherein the device is a wireless device.

15. The device of claim 9, wherein the device-specific master credential corresponds to a shared secret key between the device and a credential server that is configured to authenticate, on behalf of the data server, a request for data from the application running on the device.

16. The device of claim 9, further comprising:
transmitting logic that operates to transmit, to the data server, a request for data that includes the application identifier and the application-specific credential.

17. A device configured to provide information by which an application running on the device can be authenticated to a data server, comprising:
means for receiving a request to generate an application-specific credential for the application running on the device, wherein the request is associated with an application identifier that identifies the application; and means for generating the application-specific credential using the application identifier and a device-specific master credential.

18. The device of claim 17, wherein the means for generating generates the application-specific credential using a one-way generation technique, so that the application identifier and the device-specific master credential cannot be discovered from the application-specific credential.

19. The device of claim 17, further comprising means for using a modification detection and/or authentication technique to determine if the application and/or application identifier have been modified and prove the application is associated with the application identifier.

20. The device of claim 19, wherein the modification detection and/or authentication technique is generated by a server distinct from a provider of the application.

21. The device of claim 19, wherein the modification detection and/or authentication technique is a digital signature.

22. The device of claim 17, wherein the device-specific master credential corresponds to a shared secret key between the device and a credential server that is configured to authenticate, on behalf of the data server, a request for data from the application running on the device.

23. The device of claim 17, further comprising:
means for transmitting, to the data server, a request for data that includes the application identifier and the application-specific credential.

24. A non-transitory computer-readable media comprising instructions, which when executed by a processor in a device, causes the device to provide information by which an application running on the device can be authenticated to a data server, the instructions comprising:
at least one instruction for receiving from the application running on the device, a request to generate an application-specific credential for the application running on the device, wherein the request is associated with an application identifier that identifies the application; and at least one instruction for generating the application-specific credential using the application identifier and a device-specific master credential.

25. The non-transitory computer-readable media of claim 24, wherein the application-specific credential is generated using a one-way generation technique, so that the application identifier and the device-specific master credential cannot be discovered from the application-specific credential.

26. The non-transitory computer-readable media of claim 25, wherein a modification detection and/or authentication technique that operates to determine if the application and/or the application identifier have been modified is generated by a server that is distinct from a provider of the application.

27. The non-transitory computer-readable media of claim 25, wherein a modification detection and/or authentication technique that operates to determine if a application and/or the application identifier have been modified is a digital signature.

28. The non-transitory computer-readable media of claim 24, wherein the at least one instruction for generating generates the application-specific credential using a one-way generation technique, so that the application identifier and the device-specific master credential cannot be discovered from the application-specific credential.

29. The non-transitory computer-readable media of claim 24, wherein the device is a wireless device.

30. The non-transitory computer-readable media of claim 24, wherein the device-specific master credential corresponds to a shared secret key between the device and a credential server that is configured to authenticate, on behalf of the data server, a request for data from the application running on the device.

31. The non-transitory computer-readable media of claim 24, further comprising:
instructions for transmitting, to the data server, a request for data that includes the application identifier and the application-specific credential.

* * * * *